United States Patent
Murase et al.

(10) Patent No.: US 8,332,636 B2
(45) Date of Patent: *Dec. 11, 2012

(54) SECURE POLICY DIFFERENTIATION BY SECURE KERNEL DESIGN

(75) Inventors: Masana Murase, Kawasaki (JP);
Masaharu Sakamoto, Yokohama (JP);
Kanna Shimizu, Austin, TX (US);
Vladimir Zbarsky, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

This patent is subject to a terminal disclaimer.

(21) Appl. No.: 11/866,001

(22) Filed: Oct. 2, 2007

(65) Prior Publication Data

US 2009/0089579 A1    Apr. 2, 2009

(51) Int. Cl.
*H04L 29/06* (2006.01)

(52) U.S. Cl. .................. 713/164; 713/167; 380/277

(58) Field of Classification Search .............. 713/153, 713/164–171, 176, 192; 380/277; 101/122
See application file for complete search history.

(56) References Cited

U.S. PATENT DOCUMENTS

| | | | |
|---|---|---|---|
| 5,987,129 A | 11/1999 | Baba | |
| 6,263,431 B1 | 7/2001 | Lovelace et al. | |
| 6,327,652 B1 | 12/2001 | England et al. | |
| 6,330,670 B1 | 12/2001 | England et al. | |
| 6,704,871 B1 | 3/2004 | Kaplan et al. | |
| 6,775,778 B1* | 8/2004 | Laczko et al. | 713/194 |
| 7,188,127 B2 | 3/2007 | Stakutis et al. | |
| 7,243,340 B2* | 7/2007 | Tobin | 717/130 |
| 7,305,564 B2 | 12/2007 | Jin et al. | |
| 7,356,707 B2* | 4/2008 | Foster et al. | 713/189 |
| 7,424,398 B2* | 9/2008 | Booth et al. | 702/186 |
| 7,516,331 B2 | 4/2009 | Jin et al. | |
| 7,577,852 B2 | 8/2009 | Okazaki et al. | |
| 7,676,840 B2 | 3/2010 | Morais et al. | |
| 7,698,696 B2* | 4/2010 | Ogawa et al. | 717/151 |
| 7,698,744 B2 | 4/2010 | Fanton et al. | |
| 7,735,136 B2* | 6/2010 | Mantripragada et al. | 726/22 |
| 7,886,162 B2 | 2/2011 | Murase et al. | |
| 2001/0056533 A1* | 12/2001 | Yianilos et al. | 713/153 |
| 2002/0004905 A1 | 1/2002 | Davis et al. | |

(Continued)

FOREIGN PATENT DOCUMENTS

EP    0686906 A    12/1995

(Continued)

OTHER PUBLICATIONS

PCT Search Report, application PCT/EP2008/062590.

(Continued)

*Primary Examiner* — Eleni Shiferaw
*Assistant Examiner* — Jing Sims
(74) *Attorney, Agent, or Firm* — Yudell Isidore Ng Russell PLLC

(57) ABSTRACT

A method, computer program product, and data processing system are disclosed for ensuring that applications executed in the data processing system originate only from trusted sources are disclosed. In a preferred embodiment, a secure operating kernel maintains a "key ring" containing keys corresponding to trusted software vendors. The secure kernel uses vendor keys to verify that a given application was signed by an approved vendor. To make it possible for users to execute software from independent software developers, an administrative user may disable the above-described vendor key-checking as an option.

20 Claims, 11 Drawing Sheets

U.S. PATENT DOCUMENTS

| | | | |
|---|---|---|---|
| 2002/0080958 | A1 | 6/2002 | Ober et al. |
| 2003/0018892 | A1 | 1/2003 | Tello |
| 2003/0200450 | A1 | 10/2003 | England et al. |
| 2004/0044906 | A1 | 3/2004 | England et al. |
| 2004/0052259 | A1* | 3/2004 | Garcia et al. ............ 370/392 |
| 2004/0243836 | A1* | 12/2004 | England et al. ............ 713/200 |
| 2005/0022026 | A1 | 1/2005 | Riordan |
| 2005/0120242 | A1 | 6/2005 | Mayer et al. |
| 2005/0144440 | A1 | 6/2005 | Catherman et al. |
| 2006/0021064 | A1 | 1/2006 | England et al. |
| 2006/0182124 | A1 | 8/2006 | Cole et al. |
| 2006/0195906 | A1 | 8/2006 | Jin et al. |
| 2006/0206727 | A1 | 9/2006 | Wasson et al. |
| 2006/0233149 | A1 | 10/2006 | Rustagi et al. |
| 2006/0282681 | A1 | 12/2006 | Scheidt et al. |
| 2006/0294372 | A1* | 12/2006 | Maxa et al. ............ 713/165 |
| 2007/0143223 | A1 | 6/2007 | Bhave et al. |
| 2007/0160197 | A1 | 7/2007 | Kagaya et al. |
| 2007/0160200 | A1 | 7/2007 | Ishikawa et al. |
| 2007/0198851 | A1 | 8/2007 | Goto |
| 2007/0226492 | A1 | 9/2007 | Peinado et al. |
| 2007/0245410 | A1 | 10/2007 | Perlman et al. |
| 2008/0005565 | A1 | 1/2008 | Shiga et al. |
| 2008/0072070 | A1 | 3/2008 | LaMacchia et al. |
| 2008/0091945 | A1 | 4/2008 | Princen et al. |
| 2008/0095371 | A1 | 4/2008 | Vataja |
| 2008/0117679 | A1 | 5/2008 | Srinivasan et al. |
| 2008/0148061 | A1 | 6/2008 | Jin et al. |
| 2008/0178256 | A1 | 7/2008 | Perrone et al. |
| 2008/0229425 | A1* | 9/2008 | Perrin et al. ............ 726/26 |
| 2008/0235507 | A1 | 9/2008 | Ishikawa et al. |
| 2008/0298581 | A1 | 12/2008 | Murase et al. |
| 2008/0301440 | A1 | 12/2008 | Plouffe, Jr. et al. |
| 2008/0301469 | A1 | 12/2008 | Plouffe, Jr. et al. |
| 2009/0086974 | A1 | 4/2009 | Murase et al. |

FOREIGN PATENT DOCUMENTS

| | | | |
|---|---|---|---|
| WO | | 03090074 A | 10/2003 |

OTHER PUBLICATIONS

U.S. Appl. No. 11/754,649, "Cryptographic Secure Program Overlays," Notice of Allowance dated Sep. 27, 2010.

Virtual Secure Coprocessing on General-purpose Processors, http://palms.ee.princeton.edu/PALMSopen/mcgregor02virtual.pdf/John P. McGregor and Ruby B. Lee/Feb. 21, 2007.

U.S. Appl. No. 11/754,649, "Cryptographic Secure Program Overlays," Non-Final Office Action dated Apr. 13, 2010.

U.S. Appl. No. 11/754,667, "Application-Specific Secret Generation," Final Office Action dated Aug. 26, 2010.

U.S. Appl. No. 11/754,678 "Cryptographically-enabled Privileged Mode Execution," Non-Final Office Action dated Mar. 24, 2010.

U.S. Appl. No. 11/754,678 "Cryptographically-enabled Privileged Mode Execution," Final Office Action dated Aug. 31, 2010.

U.S. Appl. No. 11/754,667, "Application-Specific Secret Generation," Non-Final Office Action dated Mar. 23, 2010.

U.S. Appl. No. 11/866,020, "Support for Multiple Security Policies on a Unified Authentication Architecture," Notice of Allowance dated Dec. 21, 2011.

U.S. Appl. No. 11/866,020, "Support for Multiple Security Policies on a Unified Authentication Architecture," Final Office Action dated Aug. 29, 2011.

U.S. Appl. No. 11/866,020, "Support for Multiple Security Policies on a Unified Authentication Architecture," Non-Final Office Action dated Mar. 16, 2011.

U.S. Appl. No. 11/754,658, "Updateable Secure Kernel Extensions," Non-Final Office Action dated Apr. 6, 2010.

U.S. Appl. No. 11/754,658, "Updateable Secure Kernel Extensions," Final Office Action dated Sep. 7, 2010.

* cited by examiner

SECURE POLICY DIFFERENTIATION BY SECURE KERNEL DESIGN

CROSS-REFERENCE TO RELATED APPLICATIONS

The present application is related to U.S. patent application Ser. No. 11/754,678, entitled "Cryptographically-enabled Privileged Mode Execution;" U.S. patent application Ser. No. 11/754,667, entitled "Application-Specific Secret Generation;" U.S. patent application Ser. No. 11/754,658, entitled "Updateable Secure Kernel Extensions;" and U.S. patent application Ser. No. 11/754,649, entitled "Cryptographic Secure Program Overlays," which are assigned to the same assignee hereof and hereby incorporated by reference in their entirety.

The present application is related to U.S. patent application Ser. No. 11/866,020, entitled "Support for Multiple Security Policies on a Unified Authentication Architecture," which is filed even date hereof, assigned to the same assignee, and hereby incorporated by reference in its entirety.

BACKGROUND OF THE INVENTION

1. Technical Field

The present invention relates generally to secure software execution in a data processing system. Specifically, the present invention is directed to a method of ensuring that applications executed in the data processing system originate only from trusted sources.

2. Description of the Related Art

One of the primary tasks for an operating system or runtime environment is to maintain the security and stability of the computer system. Ideally, an operating system or run-time environment should ensure that only "safe" applications that can be proven not to jeopardize the security and stability of the system will be allowed to execute. The unfortunate truth, as computer scientists and mathematicians in the field of computability theory have known for many years, is that it is very difficult—and in many cases impossible—to definitively predict in advance whether a given program is "safe." For this reason, a more practical solution is to allow only applications that are believed to be safe to execute.

This "belief" can be established in two basic ways. One is by inspecting the code itself to detect certain indicators of safety problems. This is the approach taken by virus scanning software, which scans for signatures of known viruses. This technique is also employed in the JAVA Virtual Machine bytecode verification scheme, which looks for patterns indicative of unsafe or corrupted code. JAVA is an object-oriented programming language and runtime environment specification developed by Sun Microsystems, Inc. of Santa Clara, Calif.

The other way is to allow only "trusted" applications to execute—that is, applications that come from a trusted source. The JAVA Virtual Machine supports this second method as well, as JAVA allows a developer to affix a digital signature to JAVA code, which can be verified by the JAVA Virtual Machine at runtime. The JAVA Virtual Machine can be configured to allow only JAVA code that has been digitally signed by a trusted source to perform certain security-sensitive operations.

Because JAVA bytecode executes in a virtual machine, the virtual machine can make runtime determinations about the potential security risks associated with a given operation "on the fly" at the time the potentially harmful bytecodes are about to be executed. While this ability is advantageous, the additional complexity and computational overhead imposed by using a virtual machine is disadvantageous in some applications. Further, because a virtual machine is software, it must store its cryptographic keys (which it uses for verifying digital signatures) in software-accessible storage. The fact that the keys are stored in this way means that they are subject to modification or replacement like any other data. It is therefore possible to circumvent the security restrictions imposed by the JAVA virtual machine by simply modifying the stored set of keys.

What is needed, therefore, is an efficient, yet highly secure method of ensuring that only trusted code is executed in a computer system. The present invention provides a solution to this and other problems, and offers other advantages over previous solutions.

SUMMARY OF THE INVENTION

Accordingly, the present invention provides a method, computer program product, and data processing system for ensuring that applications executed in the data processing system originate only from trusted sources. In a preferred embodiment, secure initialization hardware loads and decrypts a secure kernel into memory, where the secure kernel contains an embedded cryptographic key pair. Separately from the secure kernel, a "key ring" containing keys corresponding to trusted software vendors is maintained, where each of these keys is digitally signed using the private key of the embedded cryptographic key pair. When an application is loaded into memory by the secure kernel for execution, the secure kernel uses the public key from its embedded key pair to verify a vendor key from its key ring. Then, having established the authenticity of the vendor key, uses the vendor key to verify the authenticity of a public key associated with the application. This application public key is then used to verify the integrity of the application image. To make it possible for users to execute software from independent software developers (who do not have their own vendor key), the vendor key-checking described above may be disabled as an option.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
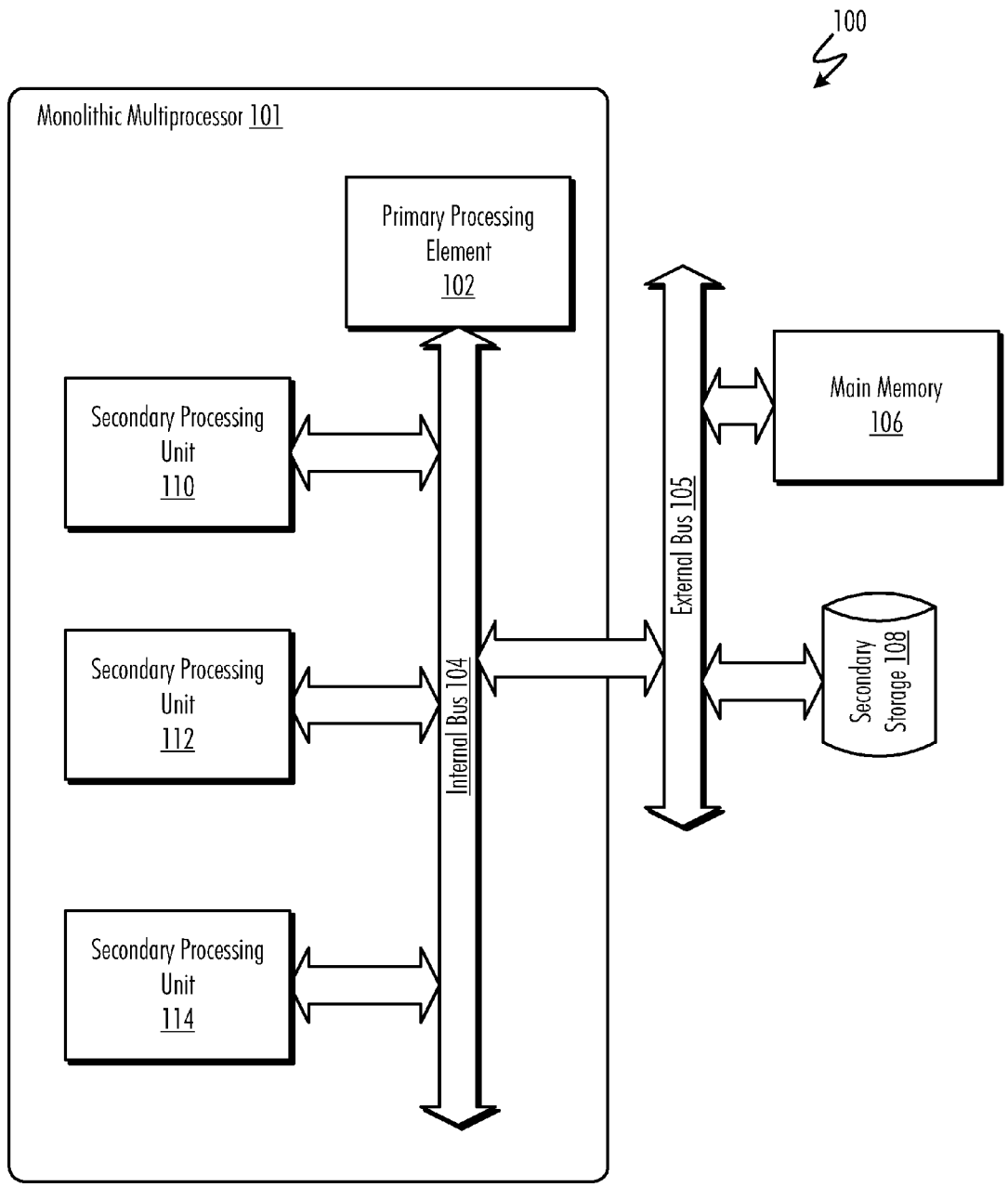
FIG. 1 is a block diagram of an exemplary data processing system in which a preferred embodiment of the present invention may be implemented.

FIG. 1 is a block diagram of an exemplary data processing system 100 in which a preferred embodiment of the present invention may be implemented. Data processing system 100 comprises a monolithic multiprocessor 101 containing several processor cores on a single integrated circuit. Monolithic multiprocessor 101 includes a general-purpose primary processing element 102 and several secondary processing units for performing more specialized, computationally-intensive functions (secondary processing units 110, 112, and 114), connected by an internal bus 104. An external bus 105, external to monolithic multiprocessor 101, interfaces monolithic multiprocessor 101 with main memory 106 and secondary storage 108, as well as other peripheral devices (not shown).

Each of secondary processing units 110, 112, and 114 contains its own local memory in addition to main memory 106. This allows secondary processing units 110, 112, and 114 to operate independently of primary processing element 102 in isolation mode, in which a particular secondary processing unit performs computations using its local memory without interference from primary processing element 102. When not in isolation mode, secondary processing units 110, 112, and 114 may allow primary processing element 102 to access their respective local memory spaces. In this preferred embodiment primary, processing element 102 includes hardware support for memory protection (in main memory 106), but secondary processing units 110, 112, and 114 do not contain memory protection hardware to prevent improper memory accesses of local memory within a secondary processing unit while in isolation mode.

Figure 2:
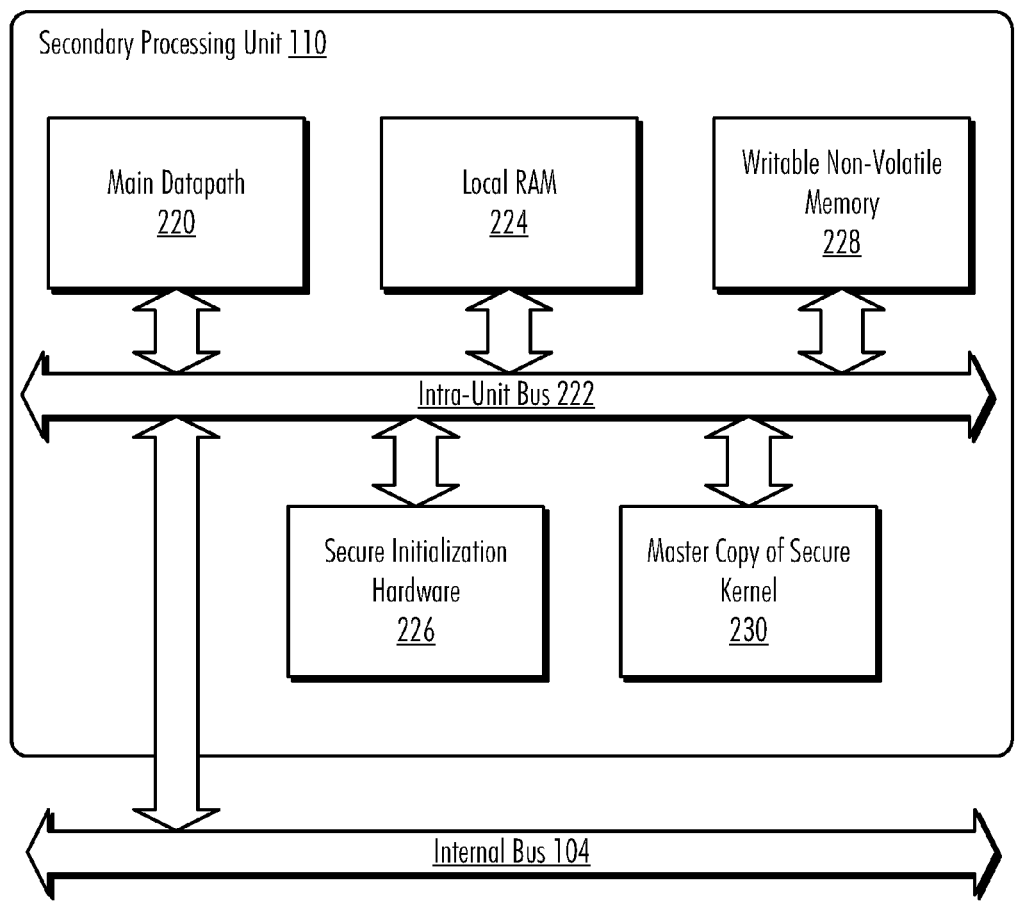
FIG. 2 is a block diagram of a secondary processing unit in accordance with a preferred embodiment of the present invention.

A more detailed depiction of secondary processing unit 110 in accordance with a preferred embodiment of the present invention is provided in FIG. 2. Secondary processing unit 110 is interfaced to internal bus 104 (internal to monolithic multiprocessor 101), but also contains its own intra-unit bus 222 internal to itself. Secondary processing unit 110 contains a main datapath 220, which comprises the control logic, registers, and functional units used to execute stored programs of instructions in secondary processing unit 110. In addition to its main datapath 220, secondary processing unit 110 contains its own local random access memory (RAM) 224 and persistent-storage memory 228 (which may or may not comprise a non-volatile memory technology, such as flash memory), for storing information persistently between operating sessions.

Startup of secondary processing unit 110 is handled by secure initialization hardware 226, which is independent of main datapath 220. It should be noted that in this context, the term "initialization" is used loosely to refer to an initialization of secondary processing unit 110, which need not occur in conjunction with initialization of data processing system 100 as a whole. In a preferred embodiment of the present invention, initialization of secondary processing unit 110 occurs each time secondary processing unit 110 is brought into isolation mode, which may occur many times between actual system reinitializations, for example. Hence, in this context, "initialization hardware" refers to the hardware used to initialize the particular processing unit or datapath to be used for executing the secure kernel (which, in the case of the preferred embodiment described herein, is secondary processing unit 110).

However, this usage of the term "initialization" should not be understood as limiting the scope of the present invention to the particular hardware of the preferred embodiment. For example, the encryption-based protection scheme of the present invention could also be applied to a single-datapath processor (or "uniprocessor"), in which case initialization of the single datapath by secure initialization hardware would be essentially equivalent to a "warm initialization" or "reset" of the data processing system as a whole.

In addition to resetting and enabling main datapath 220 during an initialization of secondary processing unit 110, secure initialization hardware 226 also contains decryption hardware for decrypting an encrypted master copy of a system kernel (master copy 230) into local RAM 224 as part of the initialization process. The decryption key for decrypting master copy 230 is embedded into secure initialization hardware 226 such that it cannot be read from main datapath 220 (or from intra-unit bus 222, for that matter). This can be done by storing the key securely in non-volatile memory internal to secure initialization hardware 226 or by actually hard-wiring the decryption process into the logic of secure initialization hardware 226, such that the decryption key is not stored, but integrated implicitly into the decryption logic. Once the system kernel has been decrypted, secure initialization hardware 226 triggers main datapath 220 to begin executing the decrypted secure kernel. The decrypted secure kernel then uses a combination of public-key cryptography and digital signature verification to provide a software-based form of protection that is local to secondary processing unit 110 and may be used in isolation mode.

In public-key cryptography, separate keys are used for encryption and decryption. Each party has two keys, a "public key," used for encryption, and a "private key" used to decrypt messages encrypted with the public key. A party's public key is "public" in the sense that the party makes the public key available to anyone who wishes to send encrypted messages to that party, while the private key remains secret. Even though multiple parties may possess the same public key, only the private key may be used to decrypt messages encrypted with the public key. In other words, it is computationally infeasible to decrypt a message encrypted with the public key unless one possesses the private key. This is in contrast to traditional secret key cryptosystems in which the same secret key is used for both encryption and decryption. Perhaps the best-known and most widely used public-key cryptosystem is the Rivest-Shamir-Adleman or RSA crypto system, which is described in U.S. Pat. No. 4,405,829. Public-key cryptography is widely used for making secure transactions over the Internet, as it prevents eavesdropping by third parties.

Although public-key cryptography is very useful in keeping information secret, public-key cryptography does not guard against forged or corrupted information. Since the public key can be distributed to others, and anyone possessing the public-key can encrypt messages that may only be read with the private key, public-key cryptography provides no way for the recipient of a message to know whether the message being received is genuine or originates with the source it purports to have originated from. For this reason, public-key cryptography is often used in conjunction with other cryptographic techniques that can be used to authenticate communications and verify the integrity of a message. Digital signatures are a natural complement to public-key cryptography that can be used to verify the identity of the originator of a message. With digital signatures, the sender of a message has a public/private key pair. When the sender sends a message, the sender uses its private key and the text of the message itself to compute a code that can be affixed to the message. This code is referred to as a digital signature. The recipient of the message will possess the sender's public key, which it can use to verify that the digital signature attached to a particular message was signed using the private key of the sender corresponding to that public key. One of the earliest digital signature schemes was the Rivest-Shamir-Adleman or RSA digital signature scheme, which, like the RSA public-key cryptosystem, is described in U.S. Pat. No. 4,405,829.

A preferred embodiment of the present invention makes extensive use of both public-key cryptography and digital signatures to provide data secrecy, preserve data integrity, and prevent unauthorized actions. However, one skilled in the art will recognize that implementation of the present invention is not dependent on the use of any particular type of cryptosystem or digital signature scheme. Any presently known or future-developed cryptosystem or digital signature scheme may be utilized in an embodiment of the present invention.

Figure 3:
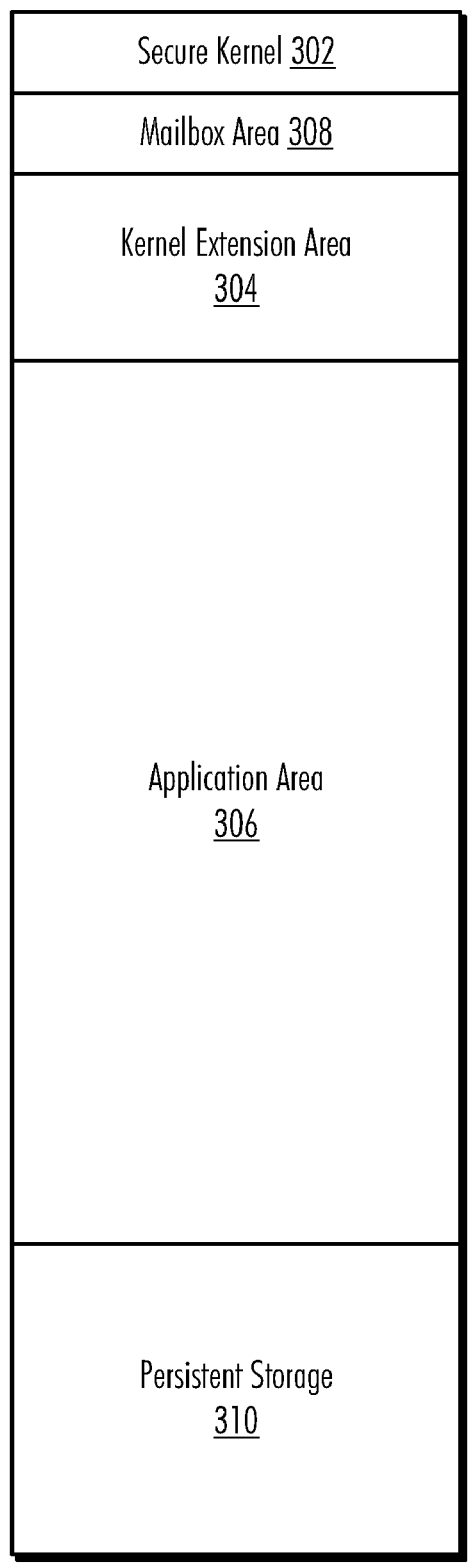
FIG. 3 is a memory map showing memory usage in a data processing system made in accordance with a preferred embodiment of the present invention.

FIG. 3 is a memory map showing memory usage in a data processing system made in accordance with a preferred embodiment of the present invention. The most privileged piece of software in the system is secure kernel 302, whose main function is to validate and authenticate other pieces of software, including kernel extensions, which reside in kernel extension area 304. Kernel extensions provide the main functionality to system software, and may be updated, replaced, or added, as necessary or desired. Secure kernel 302, on the other hand, is endowed with minimal functionality and is intended to remain the same during the lifetime of the data processing system. Secure kernel 302 is "secure" because its sensitive internals are shielded from inspection or access by other programs residing in the data processing system. As will be seen, this security is maintained through a combination of selective deletion of secret information and careful use of cryptographic techniques. Among the sensitive pieces of internal information contained in secure kernel 302 is a private key that is specific to that particular copy of secure kernel 302. In a preferred embodiment of the invention, secure kernel 302's private key is specific to the particular chip (so that another chip from the same manufacturer of the same type and version would still have a different private key). Secure kernel 302 also has a public key corresponding to its private key, but the public key need not be kept secret (since it is a public key). Other sensitive pieces of information contained in secure kernel 302 would include other cryptographic keys as well as instructions for performing operations deemed to be privileged.

Secure kernel 302 is loaded into memory from a master copy whenever secondary processing unit 110 is initialized by secure initialization hardware 226. This master copy is stored in encrypted form. The decryption key needed to decrypt the master copy is incorporated into secure initialization hardware 226 (FIG. 2) and is not accessible to software. Consequently, secure kernel 302 can only be loaded into memory when secure initialization hardware 226 is activated (during an initialization of secondary processing unit 110, as described above). This not only keeps sensitive portions of secure kernel 302 secret, but it also ensures that secure kernel 302, when loaded into memory, is genuine and has not been tampered with.

Application software is loaded into and executes from application area 306. Because no hardware memory protection scheme exists in a preferred embodiment of the present invention, applications executing from application area 306 may freely access other parts of the memory space, including such memory areas as kernel extension area 304 and secure kernel area 302. The effect of memory protection is achieved, however, by deleting sensitive information from secure kernel area 302 and kernel extension area 304 prior to transferring control to an application residing in application area 306, and by using secure initialization hardware to reload secure kernel 302 and any kernel extensions, when it becomes necessary to invoke kernel extension code.

For an application residing in application area 306 to make use of a kernel service, the application first writes information to mailbox area 308. This information will include information regarding the particular kernel service requested as well as information necessary to return control to the application, such as a callback address. Once this information has been written to mailbox area 308, the application triggers secure initialization hardware 226 to re-initialize secondary processing unit 110. This causes a fresh copy of secure kernel 302 (including any sensitive portions thereof) to be loaded before any kernel services are performed. The sensitive portions of secure kernel 302 as well as any kernel extensions are then deleted before returning control to the application, according to the instructions left in mailbox area 308.

A similar mechanism is also used for kernel extensions to prevent particular kernel extensions from having access to all of secure kernel 302's secrets. Those sensitive portions of secure kernel 302 that are not needed by a kernel extension to perform a task are deleted by secure kernel 302 prior to passing control to the kernel extension. In this way, secure kernel 302 can delegate all or only some of its powers and responsibilities to a given kernel extension. Using kernel extensions to perform most system software tasks allows system software to be updated without having to modify secure kernel 302. This allows secure kernel 302's master copy to be decrypted using an unrecoverable decryption key incorporated in secure initialization hardware 226. Since secure kernel 302 will never change, even if other system software is updated or replaced, there is no need to store the decryption key (or a corresponding encryption key, assuming it is different) anywhere outside of the secure initialization hardware—or if the decryption process is hard-wired into the logic of the hardware, anywhere at all.

Additionally, a persistent storage area 310 is provided to allow applications to store persistent data. Persistent data is data that remains stored between invocations of one or more applications. An example of persistent data might be a database, or in the case of a video game console, a list of high scorers for a game.

Figure 4:
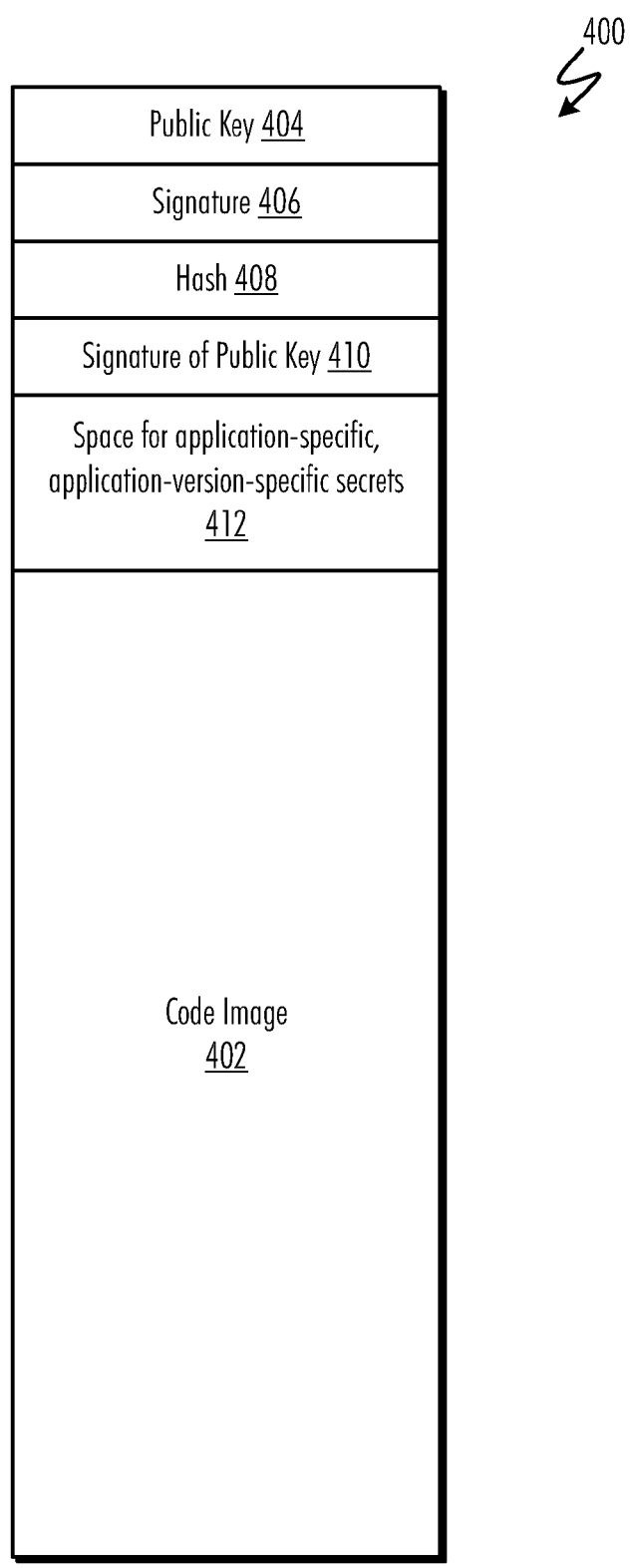
FIG. 4 is a memory diagram of an application 400 for use in a data processing system made in accordance with a preferred embodiment of the present invention.

As mentioned above, secure kernel 302 authenticates and validates the integrity of other pieces of software in the data processing system, including applications and kernel extensions. FIG. 4 is a memory diagram of an application 400 for use in a data processing system made in accordance with a preferred embodiment of the present invention. In addition to the actual executable code itself (code image 402), application 400 includes a public key 404, which may be used to verify a digital signature 406 of application 400. In a preferred embodiment of the present invention, public key 404 is specific to a particular application title, but not to a particular version of that application, so that multiple versions of the same application have the same public key 404.

In addition, a cryptographic hash value 408 computed over code image 402 is provided to allow the integrity of application 400 to be verified. A hash value is a numerical value that is the result of a function mapping a larger block of data into a limited number of bits. A cryptographic hash value is computed using a one-way function (OWF), which is a function in which it is computationally intractable to compute the function's inverse. An example of a cryptographic hash value is the well-known SHA-1 algorithm (Secure Hash Algorithm 1), developed by the National Institute of Standards and Technology (NIST), a U.S. federal agency. Other cryptographic hash algorithms (such as SHA-256, MD5 [Message Digest 5], and many others) are known in the art and may be applied to the present invention without limitation and without departing from the scope and spirit thereof. To verify the integrity of application 400, the cryptographic hash value of code image 402 can be computed by secure kernel 302 and compared to cryptographic hash value 408 stored as part of the application. If the two values match, the application's integrity has not been compromised (i.e., code image 402 has not been tampered with or become corrupted).

In one embodiment of the present invention, the cryptographic hash value is not stored directly in application 400 (as with cryptographic hash value 408), but is instead encoded into digital signature 406. More specifically, in this particular embodiment, digital signature 406 is an encrypted copy of the cryptographic hash value calculated over code image 402. In that case, public key 404 is used to decrypt digital signature 406 to obtain the cryptographic hash value, which can then be compared with a calculated cryptographic hash value computed over code image 402.

Since public key 404 is used to verify signature 406, it is important that public key 404 not be a forgery. Therefore, a digital signature computed over public key 404 (public key signature 410) is also included in application 400. This signature can be verified by secure kernel 302 using one or more pre-defined public keys known to secure kernel 302.

Finally, additional storage space 412 is provided for the creation of application-specific and application-version-specific secrets. An application may wish to store or transmit information that can only be viewed by other versions of that application or other instances of the same version of that application. In a preferred embodiment of the present invention, secure kernel 302, upon loading an application such as application 400, generates an application-specific secret and an application-version-specific secret, which are stored in storage area 412. The application-specific secret is generated by computing a one-way function of secure kernel 302's private key (which is specific to that copy of secure kernel 302) and public key 404, which is specific to the application (but not version specific). Thus, every instance of any version of the application running under that particular copy of secure kernel 302 will receive the same application-specific secret from secure kernel 302.

The application-version-specific secret, on the other hand, is generated by computing a one-way function of secure kernel 302's private key and a cryptographic hash value of the application image (possibly, but not necessarily the same as hash value 408). This results in a secret that is specific to not only the application title and secure kernel instance, but to the particular version of the application itself.

These application-specific and application-version-specific secrets may be used for secret-key (symmetric-key) encryption of information that is to be comprehendible to only a particular application title or particular version of an application (for storage in non-volatile storage 310, for example). Further, because the secrets are computed using private key information known only to a particular copy of secure kernel 302, two different processors (running two different copies of secure kernel 302 with different private keys) will compute different application-specific and application-version-specific secrets, thus making the overall encryption scheme harder to crack. An additional benefit to having the secrets computed by secure kernel 302 upon loading is that the secrets themselves need not be stored permanently. When an application terminates, the secrets can be safely deleted, since secure kernel 302 will re-compute the secrets (with the same value) the next time the application is executed.

Kernel extensions resemble applications in that they also include a digital signature, so they may be organized in much the same way as application 400 is in FIG. 4. An important difference between kernel extensions and applications, however, is that kernel extensions are stored in encrypted form such that they can only be decrypted using secure kernel 302's private key, which itself is only available when secure kernel 302 is loaded and executed immediately following a secure initialization (using the secure initialization hardware). Public-key cryptography makes it possible to update, replace, or add kernel extensions without compromising secure kernel 302's private key. The source (manufacturer, publisher, distributor, etc.) of a kernel extension need only be supplied secure kernel 302's public key (which, unlike the private key, is not a secret) in order to encrypt a new kernel extension so that only that copy of secure kernel 302 (with its unique private key) can decrypt the kernel extension.

As stated above, secure kernel 302 may delegate one or more of its powers/responsibilities to a kernel extension. Secure kernel 302 does this by retaining (i.e., not deleting) the sensitive portions of secure kernel 302 needed to perform a particular privileged task when passing control to the kernel extension. Secure kernel 302 determines which portions to retain by examining the public key used to validate the kernel extension's digital signature. Secure kernel 302 recognizes a pre-defined set of "privileged public keys" used to sign kernel extensions. Each privileged public key is associated with a particular level of privilege—i.e., each privileged public key corresponds to one or more sensitive parts of secure kernel 302 to be retained when secure kernel 302 passes control to a kernel extension signed with that privileged public key. Thus, a kernel extension may be delegated all or only some of the secrets/privileges of secure kernel 302, according to the privilege level specified by the kernel extension's public key.

Figure 5:
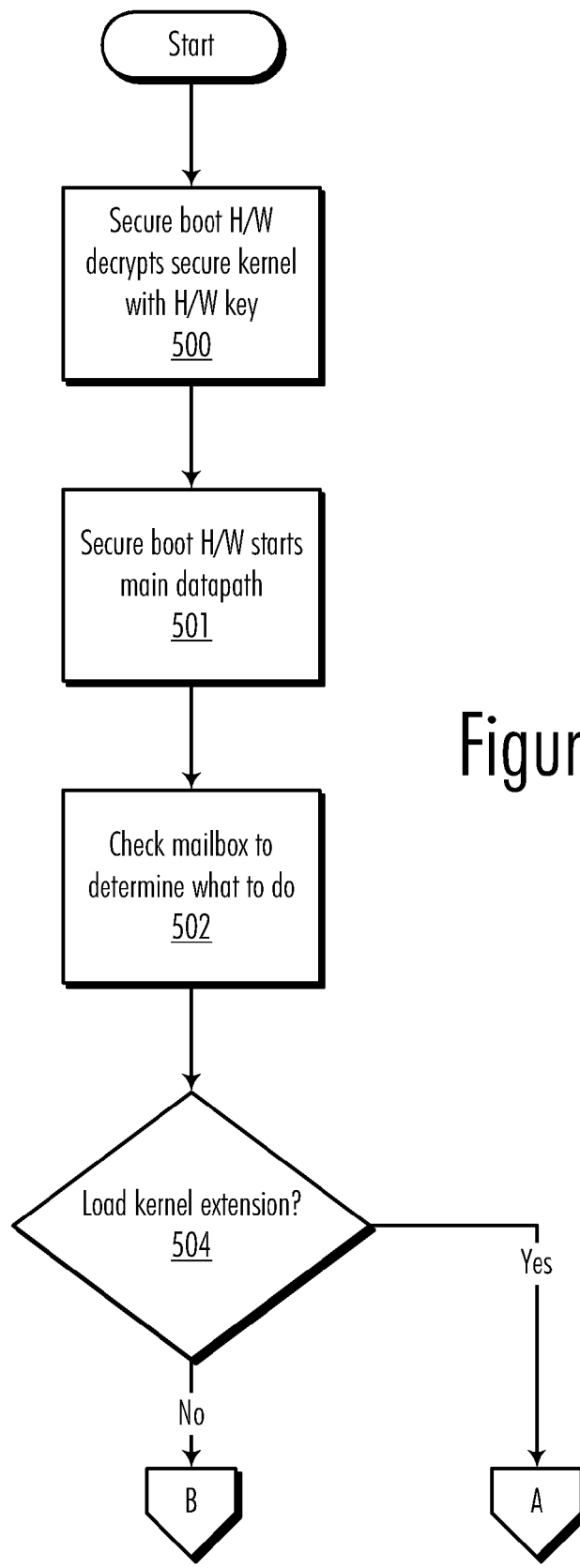
FIGS. 5-7 are a flowchart representation of a basic execution flow of a secure kernel in accordance with a preferred embodiment of the present invention.
Figure 6:
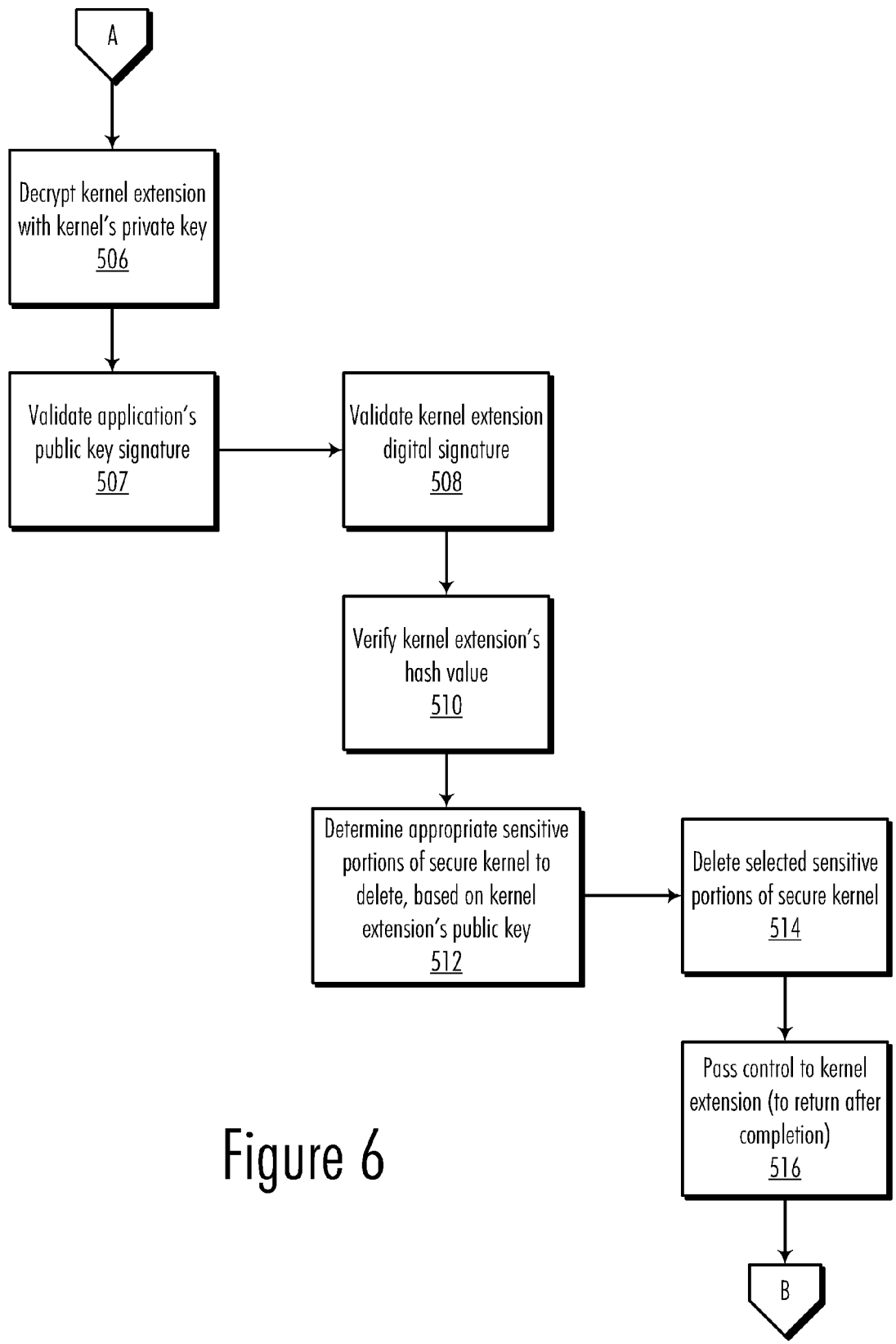
Figure 7:
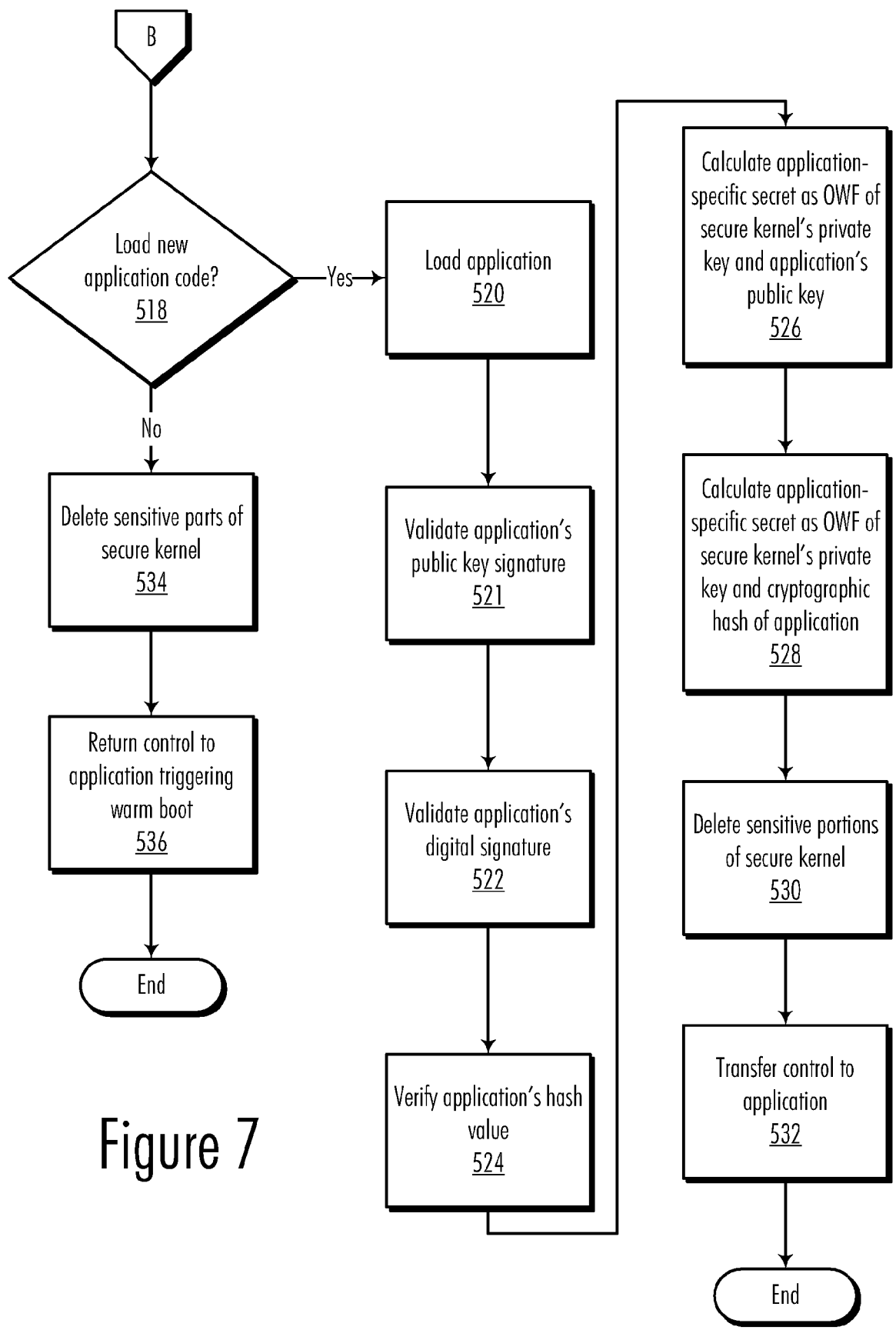

FIGS. 5-7 are together a multi-page flowchart representation of the basic flow of execution of a secure kernel made in accordance with a preferred embodiment of the present invention. FIGS. 5-7 illustrate how the various cryptographic features of a preferred embodiment work together under the direction of the secure kernel to create a system of privileged and non-privileged program code without the use of dedicated protection hardware. Before turning to the specifics of FIGS. 5-7, it should first be noted that for the purpose of simplifying the presentation, each of the digital signature and hash value verifications has been presented here as a processing step (rectangle) rather than as a decision (diamond), although by nature each of these actions involves a determination as to whether the validation or verification succeeds or fails. It should be understood throughout the following description that the failure of any verification or validation action in FIGS. 5-7 will trigger an error or exception condition that will interrupt the normal flow of execution depicted in FIGS. 5-7. Hence, each validation or verification described below should be understood as also implicitly including a decision step branching to an error condition on failure of the validation or verification.

Turning now to FIG. 5, when secure initialization hardware 226 initializes or re-initializes secondary processing unit 110 (as described above), before the main datapath of secondary processing unit 110 begins processing instructions, the secure initialization hardware decrypts the secure kernel into processor-accessible memory from the encrypted master copy (block 500). Once the secure kernel has been decrypted, the secure initialization hardware starts the main datapath of the data processing system, which then begins to execute the secure kernel (block 501).

The secure kernel then checks mailbox area 308 to determine what actions should be taken following the initialization, such as loading/executing a particular kernel extension or returning control to an application that triggered a warm initialization (block 502). Additionally, checking mailbox area 308 allows the secure kernel to determine whether a warm or cold initialization has occurred. Next a determination is made as to whether a kernel extension should be loaded (block 504). If so (block 504: yes), then the secure kernel decrypts the desired kernel extension into processor-accessible memory using the secure kernel's private key (block 506). The secure kernel validates the digital signature of the public key supplied with the kernel extension using a predefined public key known to the secure kernel (i.e., stored in the secure kernel's "key ring") (block 507). The secure kernel then validates the digital signature of the kernel extension itself using the kernel extension's public key (block 508). Next, the secure kernel verifies the integrity of the kernel extension using by computing a hash value of the kernel extension and comparing the computed hash value to that supplied with the kernel extension (block 510).

If the kernel extension passes each of these validations/ verifications, a determination is made as to which sensitive portions of the secure kernel should be deleted or retained before passing control to the kernel extension (block 512). As stated above, this determination is based on which public key was used to sign the kernel extension, each public key corresponding to a set of sensitive portions to be retained (or equivalently, which sensitive portions should be deleted) before passing control to a kernel extension signed with that public key. Once it is determined which sensitive portions of the secure kernel should be retained, the remainder of the sensitive portions of the secure kernel are deleted (block 514) and the secure kernel passes control to the loaded kernel extension (block 516).

Upon returning to execution of the secure kernel from the execution of a loaded kernel extension (following block 516), or if no kernel extension was loaded (block 504: No), a determination is made as to whether new application code should be loaded into memory for execution (block 518). If so (block 518: Yes), the application code is loaded into processor-accessible memory (block 520). The signature of the public key of the newly loaded application code is then validated using a pre-defined public key known to the secure kernel (block 521). The signature of the application itself is then validated using the application's validated public key (block 522). Next, the integrity of the application is verified by computing a hash value of the application and comparing the computed hash value to that supplied with the application (block 524).

Once the application has been validated and verified, the secure kernel generates an application-specific secret by computing a one-way function from the secure kernel's private key and the application's public key (block 526). The secure kernel also generates an application-version-specific secret by computing a one-way function from the secure kernel's private key and a hash value computed from the bytes of the application itself (block 528). These secrets are stored by the secure kernel in memory so as to be accessible to the loaded application (e.g., in secret space 412 of the application).

After application-specific and application-version-specific secrets have been computed by the secure kernel, the secure kernel deletes the sensitive portions of itself (including its private key, privileged code portions, and any other secrets of the secure kernel) (block 530). The secure kernel then fully transfers control (branches) to the application (block 532) (there being no further processing performed by the secure kernel until the next secure initialization). If a new application is not loaded (block 518: No), then the secure kernel deletes the sensitive portions of itself (block 534), then passes control to the application code address indicated in mailbox area 308 (i.e., to the application which initiated the warm initialization triggering the execution of the secure kernel) (block 536).

The process illustrated in flowchart form in FIGS. 5-7 includes verification of the authenticity and integrity of a loaded application, but, as illustrated, does not include any mechanism for ensuring that the application, in fact, comes from a trusted source. An additional mechanism for achieving this goal is described in FIG. 8.

Figure 8:
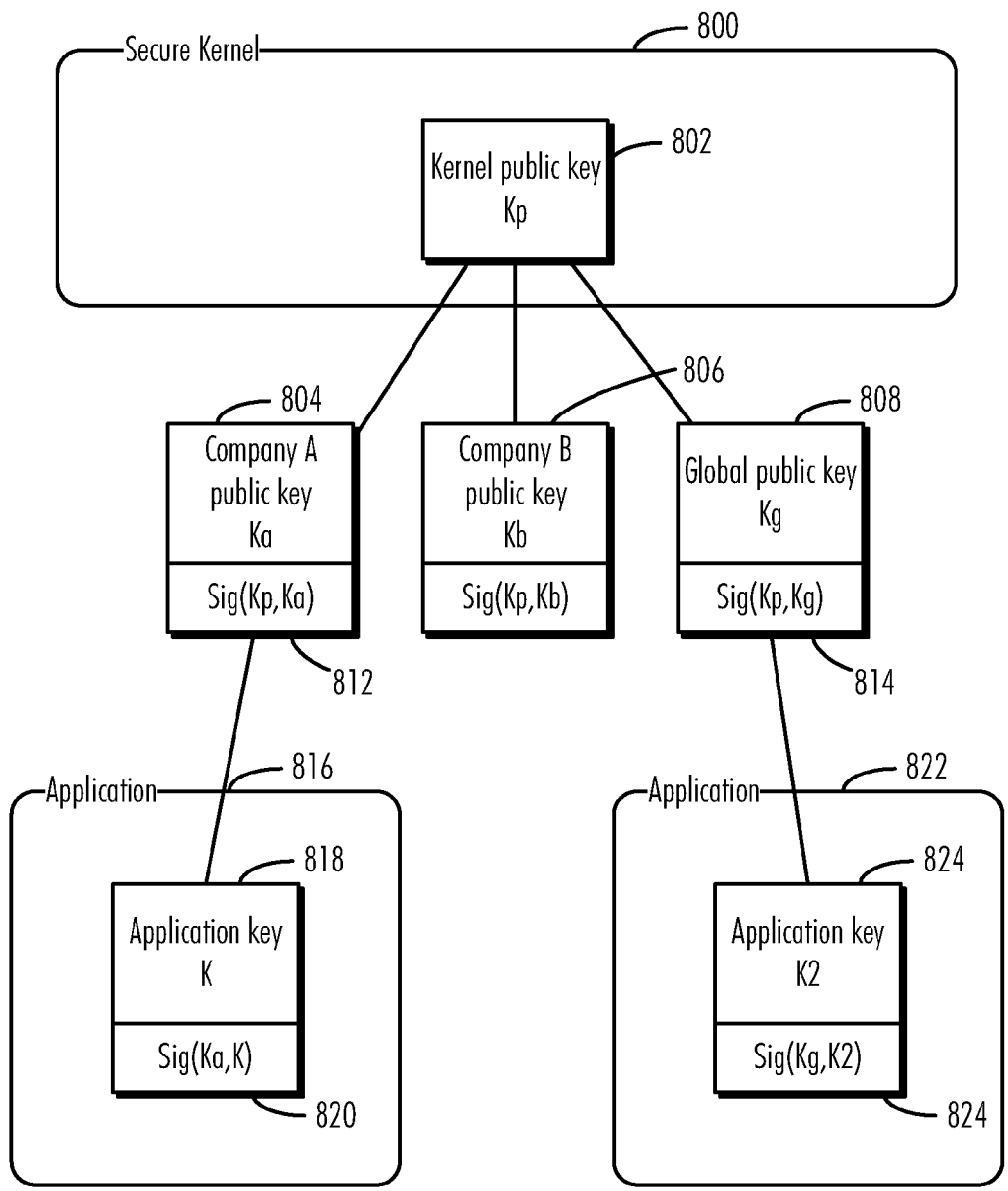
FIG. 8 is a diagram illustrating a scheme for ensuring verifying the trustedness of application code in a preferred embodiment of the present invention.

In FIG. 8, secure kernel 800 is shown possessing an embedded kernel-specific public key 802 (the same key referred to in conjunction with block 521 above). In addition to embedded public key 802, secure kernel 800 also has access to a number of vendor-associated public keys (keys 804, 806, and 808), which are not embedded in secure kernel, but are nonetheless accessible to it. Each of public keys 804, 806, and 808 is signed using the embedded private key corresponding with embedded kernel-specific public key 802 (so that key 802 can validate the signatures of keys 804, 806, and 808). For example, key 804 is associated with signature 812, which can be validated using secure kernel public key 802. Public keys 804, 806, and 808 correspond to trusted software vendors.

An application from one of these trusted vendors (e.g., application 816) will contain its own application-specific key (e.g., application-specific key 818). This is the same application-specific key referred to in conjunction with block 522, above. As application 816 is associated with the trusted vendor corresponding to public key 804, application-specific key 818 is signed using the private key associated with public key 804 (which is possessed by that vendor). This signature (signature 820) can therefore be validated using vendor-specific public key 804. Hence, a "chain of trust" exists from secure kernel key 802 to application key 818.

In the case of an application from an untrusted source, on the other hand, secure kernel 800 will not have a corresponding vendor-specific key it can use to validate the application's key. Thus, validation of the untrusted application's application-specific key will fail. Secure kernel 800 can therefore be placed in a "strict policy" in which only those applications that originate from trusted vendors are allowed to execute. In a preferred embodiment, this "strict policy" can be enabled as an option, so that if disabled, secure kernel 800 uses secure kernel key 802 to validate the signatures of application-specific keys. Of course, this requires that the application-specific keys be signed using the secure kernel's key pair, rather than the vendor's key pair.

Figure 9:
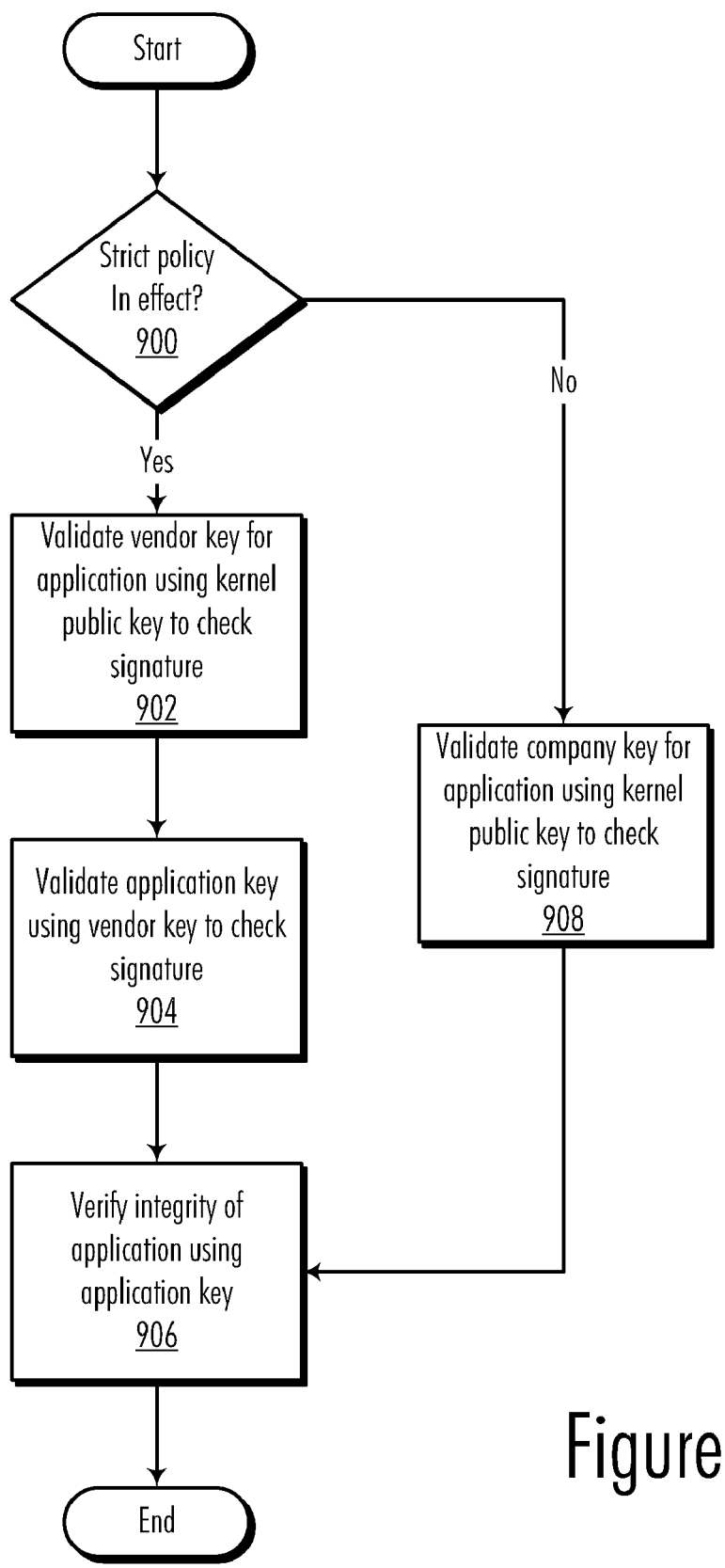
FIG. 9 is a flowchart representation of a process of verifying the trustedness of application code in a preferred embodiment of the present invention.

FIG. 9 is a flowchart representation of the basic process of verifying the trustedness of application code in a preferred embodiment of the present invention. If "strict policy" is enabled (block 900: Yes), the secure kernel first uses its own public key to validate the signature of the vendor key associated with the application's vendor (block 902). If this succeeds, the vendor key is then used to validate the signature of the application-specific key bundled with the application itself (block 904). Finally, the validated application-specific key is used to verify the integrity of the application itself prior to execution, as in FIGS. 5-7 (block 906).

If, on the other hand, the strict policy has been disabled (block 900: No), then the kernel's public key is used to directly validate the application-specific key (block 908) prior to verifying the integrity of the application (block 906).

Figure 10:
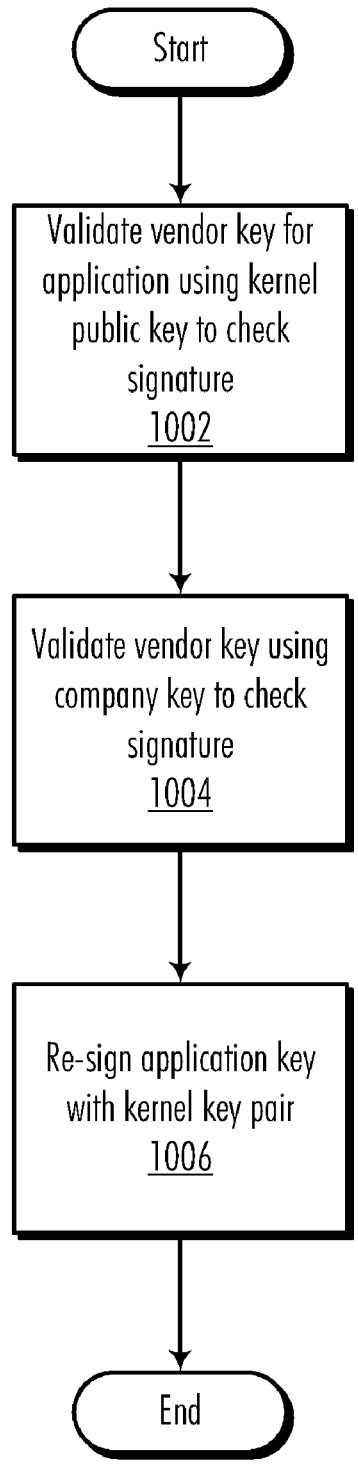
FIG. 10 is a flowchart representation of a process of pre-validating a trusted application in a preferred embodiment of the present invention.

Some of the computational overhead associated with this validation process can be avoided by employing a technique of "pre-validation" whenever an application is initially installed. FIG. 10 is a flowchart representation of a process of performing pre-validation in accordance with a preferred embodiment of the present invention. When an application is initially installed in the data processing system, the secure kernel uses its own public key to validate the signature of the vendor key associated with the application's vendor (block 1002). If this succeeds, the vendor key is then used to validate the signature of the application-specific key bundled with the application itself (block 1004). Finally, if both of these validations succeed, the secure kernel re-signs the application-specific key using its own key pair (block 1006).

Once this pre-validation has been performed, each application's application-specific key is validated directly using the secure kernel public key, just as if the strict policy had been disabled. (In other words, only blocks 908 and 906 from FIG. 9 need be executed.) This reduces the number of individual signature validations that must be performed each time an application is loaded.

Figure 11:
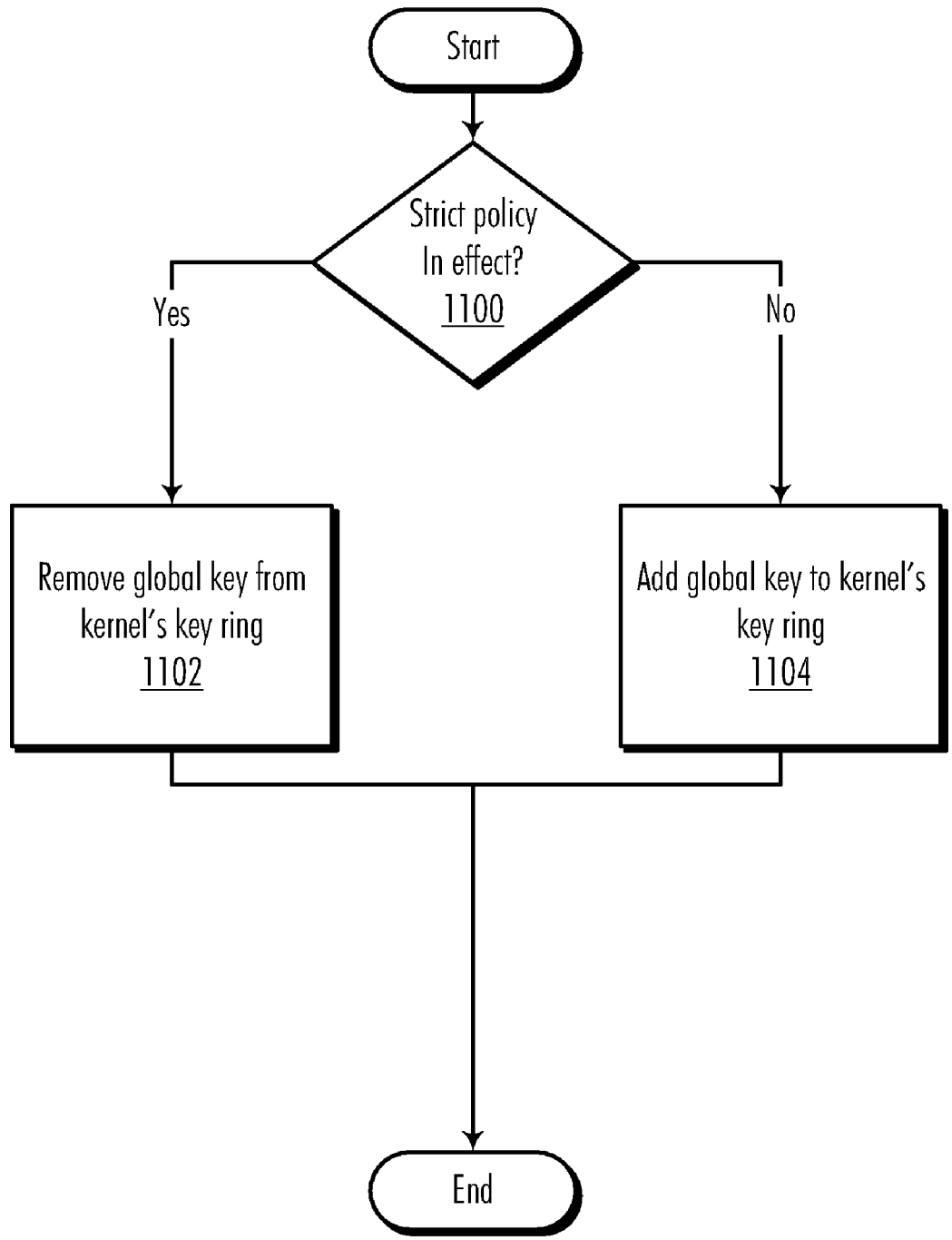
FIG. 11 is a flowchart representation of an alternative process of disabling strict policy mode in a preferred embodiment of the present invention.

An alternative method of implementing a reversable "strict policy" option is described in flowchart form FIG. 11, which eliminates the need for separate validation processes for "strict" and "non-strict" (or "open") policy modes, as depicted in FIG. 9. In this method, a distinguished "global key pair" (see global public key 808 in FIG. 8) is defined, in which both the public key and private key of the global key pair are publicly available. In this scheme, all application-specific public keys that are not associated with a vendor-specific key are signed using the global key. For instance, in FIG. 8, application 822 (which could be freeware or open-source software, for example), has an application-specific key 824 that is signed using the private key corresponding to global public key 808 (signature 824).

Enabling and disabling "strict policy" mode is then performed as depicted in FIG. 11. If the "strict policy" mode is to be enabled (block 1100), global public key 808 is removed from secure kernel 800's key ring of vendor-specific keys (block 1102). On the other hand, if "strict policy" is to be disabled (thus enabling "open policy" mode), then global public key 808 is added to secure kernel 800's key ring of vendor-specific keys (block 1104).

Once the process depicted in FIG. 11 has been carried out, all subsequent validation takes place as if in "strict policy" mode. (i.e., blocks 902, 904, and 906 in FIG. 9) Applications that do not have a vendor-specific key associated with them will be validated using global public key 808, while those applications for which a vendor-specific key exists will be validated by that vendor-specific key.

One of the preferred implementations of the invention is a computer program, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A computer-implemented method of processing data, the method comprising:

decrypting, by a computer, using initialization hardware, an encrypted copy of a secure kernel for storage into memory accessible to a processor datapath, wherein the secure kernel contains secured data comprising a secure kernel cryptographic key, a first sensitive portion and a second sensitive portion, and wherein the first sensitive portion and second sensitive portion are unique; and executing, by the computer, the secure kernel accessed from said memory, wherein the executing includes:

validating a digital signature of a vendor-associated cryptographic key using the secure kernel cryptographic key, wherein the vendor-associated cryptographic key is associated with a software vendor;

validating a digital signature of an application-associated cryptographic key using the vendor-associated cryptographic key, wherein the application-associated cryptographic key is associated with a software application;

determining that the second sensitive portion of the secured data is not required for execution of the software application when the secure kernel cryptographic key is associated with the first sensitive portion; and in response to the determination that the second sensitive portion of the secured data is not required for execution of the software application, deleting the second secure portion of the secured data from the secure kernel prior to execution of the software application.

2. The method of claim 1, wherein the application-associated cryptographic key is stored in conjunction with the software application.

3. The method of claim 1, wherein the initialization hardware operates independently from the processor datapath.

4. The method of claim 1, further comprising:
determining if validation of the application-associated cryptographic key was successful; and
in response to a determination that the validation of the application-associated cryptographic key was successful, generating a new signature of the application-associated cryptographic key using a signing cryptographic key associated with the secure kernel.

5. The method of claim 4, wherein the signing cryptographic key is a private key in a key pair in which said secure kernel cryptographic key is a corresponding public key.

6. The method of claim 1, further comprising:
verifying a digital signature of the software application using the application-associated cryptographic key.

7. The method of claim 1, further comprising:
executing the software application only if said validating of the digital signature of the application-associated cryptographic key using the vendor-associated cryptographic key succeeds.

8. A computer program product of code in a tangible computer-readable storage device for execution by a computer having a processor datapath and dedicated initialization hardware, the computer program product code comprising:

an encrypted kernel, wherein the encrypted kernel is adapted to be decrypted into a decrypted form by the dedicated initialization hardware and executed in the decrypted form by the processor datapath, the encrypted kernel including:

secured data comprising a secure kernel cryptographic key, a first sensitive portion, and a second sensitive portion, wherein the first sensitive portion and the second sensitive portion are unique;

instructions for validating a digital signature of a vendor-associated cryptographic key using the secure kernel cryptographic key, wherein the vendor-associated cryptographic key is associated with a software vendor;

instructions for validating a digital signature of an application-associated cryptographic key using the vendor-associated cryptographic key, wherein the application-associated cryptographic key is associated with a software application;

instructions for determining that the second sensitive portion of the secured data is not required for execution of the software application when the secure kernel cryptographic key is associated with the first sensitive portion; and instructions for, in response to the determination that the second sensitive portion of the secured data is not required for execution of the software application, deleting the second secure portion of the secured data from the secure kernel prior to execution of the software application.

9. The computer program product of claim 8, wherein the application-associated cryptographic key is stored in conjunction with the software application.

10. The computer program product of claim 8, wherein the initialization hardware operates independently from the processor datapath.

11. The computer program product of claim 8, wherein the encrypted kernel:
instructions for determining if validation of the application-associated cryptographic key was successful; and
instructions, responsive to a determination that the validation of the application-associated cryptographic key was successful, for generating a new signature of the application-associated cryptographic key using a signing cryptographic key associated with the secure kernel.

12. The computer program product of claim 11, wherein the signing cryptographic key is a private key in a key pair in which said secure kernel cryptographic key is a corresponding public key.

13. The computer program product of claim 8, wherein the encrypted kernel further includes:
instructions for verifying a digital signature of the software application using the application-associated cryptographic key.

14. The computer program product of claim 8, wherein the encrypted kernel further includes:
instructions for initiating execution of the software application only if said validating of the digital signature of the application-associated cryptographic key using the vendor-associated cryptographic key succeeds.

15. A data processing system comprising:
initialization hardware;
a processor datapath;
memory accessible to the processor datapath and the initialization hardware; and
non-volatile storage containing an encrypted copy of a secure kernel, wherein the secure kernel contains secured data comprising a secure kernel cryptographic key, a first secured portion, and a second secured portion, wherein the first secured portion and the second secured portion are unique, and wherein the initialization hardware decrypts the encrypted copy into the memory, the processor datapath executes the secure kernel from the memory to perform actions that include:
validating a digital signature of a vendor-associated cryptographic key using the secure kernel cryptographic key, wherein the vendor-associated cryptographic key is associated with a software vendor;
validating a digital signature of an application-associated cryptographic key using the vendor-associated cryptographic key, wherein the application-associated cryptographic key is associated with a software application;
determining that the second sensitive portion of the secured data is not required for execution of the software application when the secure kernel cryptographic key is associated with the first sensitive portion; and
in response to the determination that the second sensitive portion of the secured data is not required for execution of the software application, deleting the second secure portion of the secured data from the secure kernel prior to execution of the software application.

16. The data processing system of claim 15, wherein the application-associated cryptographic key is stored in conjunction with the software application.

17. The data processing system of claim 15, wherein the initialization hardware operates independently from the processor datapath.

18. The data processing system of claim 15, wherein the processor datapath executes the secure kernel from the memory to perform additional actions of:

determining if validation of the application-associated cryptographic key was successful; and in response to a determination that the validation of the application-associated cryptographic key was successful, generating a new signature of the application-associated cryptographic key using a signing cryptographic key associated with the secure kernel.

19. The data processing system of claim 18, wherein the signing cryptographic key is a private key in a key pair in which said secure kernel cryptographic key is a corresponding public key.

20. The data processing system of claim 15, wherein the processor datapath executes the secure kernel from the memory to perform additional actions of:

verifying a digital signature of the software application using the application-associated cryptographic key.

* * * * *